(12) United States Patent
Campesi et al.

(10) Patent No.: US 8,656,201 B2
(45) Date of Patent: Feb. 18, 2014

(54) CPU STATUS CONTROLLED UNINTERRUPTIBLE POWER SUPPLY

(75) Inventors: Robert Campesi, Cupertino, CA (US); Benjamin Abraham, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 417 days.

(21) Appl. No.: 13/063,757

(22) PCT Filed: Sep. 19, 2008

(86) PCT No.: PCT/US2008/076980
§ 371 (c)(1),
(2), (4) Date: Mar. 14, 2011

(87) PCT Pub. No.: WO2010/033123
PCT Pub. Date: Mar. 25, 2010

(65) Prior Publication Data
US 2011/0167283 A1    Jul. 7, 2011

(51) Int. Cl.
*G06F 1/26* (2006.01)
(52) U.S. Cl.
USPC .............. 713/340; 323/246; 307/31; 307/116
(58) Field of Classification Search
USPC ...................... 713/340; 323/246; 307/31, 116
See application file for complete search history.

(56) References Cited

U.S. PATENT DOCUMENTS

| 4,689,712 | A | | 8/1987 | Demeyer |
| 5,602,462 | A | * | 2/1997 | Stich et al. ................ 323/258 |
| 5,982,652 | A | * | 11/1999 | Simonelli et al. ............. 363/142 |
| 6,917,124 | B2 | | 7/2005 | Shetler, Jr. et al. |
| 6,967,283 | B2 | * | 11/2005 | Rasmussen et al. ........... 174/50 |
| 7,259,477 | B2 | * | 8/2007 | Klikic et al. ................. 307/65 |
| 7,363,520 | B1 | | 4/2008 | Maier, Jr. et al. |
| 7,566,988 | B2 | * | 7/2009 | Heber et al. .................... 307/44 |

(Continued)

FOREIGN PATENT DOCUMENTS

| KR | 100208060 | 7/1999 |
| KR | 1020060101413 | 9/2006 |

OTHER PUBLICATIONS

Scott Mueller—"Reduce Your PC's Power and Operating Costs"—PC World, Sep. 26, 2007, Available online at: http://www.pcworld.com/printable/article/id,137328/printable.htm.

(Continued)

*Primary Examiner* — Thuan Du

(57) ABSTRACT

Systems, apparatus and methods for controlling the flow of power are provided. A current source (110) can be coupled to an uninterruptible power supply (120) to provide an uninterruptible current. A first service connection (190) can be coupled to the uninterruptible current using one or more conductors. A monitor (150), measuring one or more parameters, can be disposed in, on, or about the one or more conductors coupled to the first service connection (190). A first interruptible service connection (182) can be coupled to the current source (110) using one or more conductors. A first switch (172) can be disposed in, on, or about the conductors coupled to the one or more interruptible service connections (182). A control logic device (160) can be coupled to the monitor (150) and to the first switch (172) to interrupt the flow of current to the first interruptible service connection (182) when one or more parameters measured by the monitor (150) falls below a pre-determined threshold.

12 Claims, 4 Drawing Sheets

(56) References Cited

U.S. PATENT DOCUMENTS

| | | |
|---|---|---|
| 8,025,437 B2 * | 9/2011 | Johnson, Jr. .................. 374/152 |
| 2006/0138867 A1 | 6/2006 | Tian et al. |
| 2006/0206741 A1 | 9/2006 | Allison et al. |

OTHER PUBLICATIONS

Tech ARP—PC Power Management Guide Rev. 2.0—available online at: http://www.techarp.com/showarticle.aspx?artno=420&pgno=7—last visited Mar. 11, 2011.

User Guide to Power Management in Computers—available online at: http://eetd.lbl.gov/EA/Reports/39466/39466-2—last visited Mar. 10, 2011.

Wikipedia—"CPU Power Dissipation"—available online at: http://en.wikipedia.org/wiki/CPU_power_dissipation—last visited Mar. 10, 2011.

Wikipedia—"Uninterruptible Power Supply"—available online at: http://en.wikipedia.org/wiki/Uninterruptible_Power_Supply—last visited Mar. 10, 2011.

WIPO, International Search Report, Jun. 19, 2009, PCT/US2008/076980, filed Sep. 19, 2008.

* cited by examiner

| PC Activity | ACPI State | Power (W) | Global/Sleep State | Windows XP/ Vista State | % of Full Load Power |
|---|---|---|---|---|---|
| Full CPU and Graphic Load | G0 | 305 | Power On | Running | 100% |
| 3D Screen Saver | G0 | 225 | Power On | Running | 74% |
| Simple Screen Saver | G0 | 195 | Power On | Running | 64% |
| Idle with Windows Desktop | G0 | 195 | Power On | Running | 64% |
| Monitor & Hard drives Powered Down | G0 | 160 | Power On | Running | 52% |
| Monitor & Hard Drives Powder Down, CPU Halted, Fans and Other Devices Running | S1 | 135 | Power On Suspend (POS) | Standby/Sleep | 44% |
| Context Saved in RAM, Everything Except RAM Powered Off | S3 | 10 | Suspend to RAM (STR) | Standby/Sleep | 3% |
| Context Saved to Disk, System Powered Off | S4 | 9 | Suspend to Disk (STD) | Hibernate | 3% |
| System Powered Off | S5 | 9 | Soft-Off | Shut Down | 3% |
| System Unplugged | G3 | 0 | Mechanical Off | Shut Down | 0% |

FIG.4

CPU STATUS CONTROLLED UNINTERRUPTIBLE POWER SUPPLY

BACKGROUND OF THE INVENTION

1. Field of the Invention

Embodiments of the present invention generally relate to uninterruptible power supplies. More particularly, embodiments of the present invention relate to controlling power distribution from an uninterruptible power supply based upon the power demand of one or more attached devices.

2. Description of the Related Art

This section is intended to introduce the reader to various aspects of art which may be related to one or more aspects of the present invention as described and claimed below. This discussion is believed helpful in providing the reader with background information, thereby facilitating a better understanding of various aspects of the present invention. Accordingly, it should be understood by the reader that the provided information should be read in this light and not as an admission of prior art.

Uninterruptible power supplies ("UPS") are often used to condition the power supplied to electrical appliances, computers, computer peripherals and the like. Uninterruptible power supplies can also provide a limited duration or back-up power source in the event of a failure of the primary power source. Traditionally, almost every UPS includes several common components: an incoming alternating current power source, a fast acting bypass contactor, one or more batteries, one or more rectifiers to convert a portion of the incoming AC power to DC power, and one or more inverters to convert the DC power supplied by the batteries to AC power. Various additional features can be added to a UPS, for example one or more power conditioners can be added to the AC bypass through the UPS to filter any voltage spikes or sags in the power source. Additionally, overcurrent protection devices, such as fuses and/or circuit breakers can be added to the incoming power source to guard against damage to the UPS from an overcurrent condition on the primary power source.

Uninterruptible power supplies can have multiple power distribution outlets. These distribution outlets can be UPS backed, non-UPS backed, conditioned, filtered, protected, or any combination thereof. Placing more than one type of power distribution outlet on a single UPS permits, for example, plugging a computer CPU into a UPS backed outlet, a monitor into a conditioned or filtered, non-UPS backed outlet, and one or more peripherals such as printers, scanners, desk lamps, etc. into simple: AC pass-through outlets in a single, convenient location.

The power consumption of a typical desktop personal computer CPU can vary widely, ranging from about 50 watts to 700 watts while in operation. To reduce power consumption during periods of inactivity, many CPUs are equipped with energy conservation software or firmware. The Advanced Configuration and Power Interface ("ACPI") is a typical energy conservation firmware, providing a variety of "states" in accordance with the level of CPU activity. ACPI provides multiple, reduced power consumption, "sleep" states. In one or more ACPI sleep states, the power consumption of the CPU is substantially reduced by powering down the CPU, cache, chipset and, peripherals. Often the RAM is placed into a low-power, self-refreshing mode to further conserve power. However, despite power conservation efforts within the CPU, often one or more peripherals such as printers, scanners, desk lamps, etc. remain at full power draw, thereby minimizing the energy savings. While the power demand of the CPU can be directly addressed using firmware such as ACPI, the various peripherals used in conjunction with the CPU continue to draw power even though the CPU may be in an inactive, reduced power, "sleep" state.

There is a need, therefore, for improved systems and methods for reducing the power consumption of one or more peripherals typically used in conjunction with a personal computer when the computer CPU enters one or more reduced power demand states.

SUMMARY OF THE INVENTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

A system for controlling the flow of power is provided. A current source can be coupled to an uninterruptible power supply to provide an uninterruptible current. A first service connection can be coupled to the uninterruptible current using one or more conductors. A monitor, measuring one or more parameters, can be disposed in, on, or about the one or more conductors coupled to the first service connection. One or more interruptible service connections can be coupled to the current source using one or more conductors. A first switch can be disposed in, on, or about the conductors coupled to the one or more interruptible service connections. A control logic device can be coupled to the monitor and to the first switch to interrupt the flow of current to the first interruptible service connection when one or more parameters measured by the monitor falls below a pre-determined threshold.

A method for controlling the flow of power is also provided. A current source can be introduced to an uninterruptible power supply to provide an uninterruptible current. All or a portion of the uninterruptible current can be distributed to a first service connection. The current source can be distributed to a first interruptible service connections. One or more first service connection parameters can be measured using a monitor coupled to a control logic device. The control logic device can interrupt the flow of current from the current source to a first interruptible service connection in response to a decrease in the one or more first service connection parameters below a predetermined threshold. The control logic device can resume the flow of current from the current source to the first interruptible service connection in response to an increase in the one or more first service connection parameters above a predetermined threshold.

An apparatus for controlling the flow of power is also provided. An uninterruptible power supply can be connected to a current source to provide an uninterruptible current. A first interruptible service connection can also be connected to the current source using one or more conductors. A first switch can be disposed in, on, or about the conductors connected to the first interruptible service connection. A first service connection can be coupled to the uninterruptible current using one or more conductors. A monitor can be disposed in, on, or about the one or more conductors connected to the first service connection. A control logic device can be coupled to the monitor. One or more devices can couple the control logic device to the first switch. In one or more embodiments, the one or more devices can be a relay and the first switch can be one or more contacts disposed in, on, or about the relay.

As used herein, the term "service connection" and "service connections" can refer to any form of electrical distribution connection, including, but not limited to male plug types A through M and their corresponding female receptacles. Further, as used herein, the term "service connection" refers exclusively to any UPS backed service connection, whilst the term "interruptible service connection" refers exclusively to any un-backed, i.e. non-UPS backed service connection.

As used herein, the term "conductor" and "conductors" can refer to any device, member and/or conduit suitable for the transmission of an electric current. The electric current can include, but is not limited to, direct current, alternating current, or any combination thereof. Conductors are not limited by form or media and can include, for example, uninsulated conductors, solid conductors, multi-strand conductors, insulated conductors, flat conductors disposed in, on, or about, one or more layers on one or more circuit boards, or any combination thereof. The conductors can be fabricated from one or more conductive materials known in the art. The conductors can include one or more low or high temperature superconducting materials.

As used herein, the term "coupled" can refer to any form of electrically conductive or magnetically inductive connection linking two or more devices. The connection can be electrically conductive, for example using one or more conductors such as copper or aluminum wire, conductive strips on a printed circuit board, or the like to connect two or more components. The connection can be magnetically inductive, for example, stimulating the flow of current from a transformer secondary coil by passing a current through a primary coil inductively coupled to the secondary coil. The connection can be electro-magnetic, for example by controlling current flow through a relay contact via an independent relay coil such that passage of a current through the relay coil can magnetically open and close the relay contact.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Advantages of one or more disclosed embodiments may become apparent upon reading the following detailed description and upon reference to the drawings in which:

FIG. 4 presents illustrative power savings based upon an exemplary system including one or more peripheral devices and a CPU, according to one or more embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
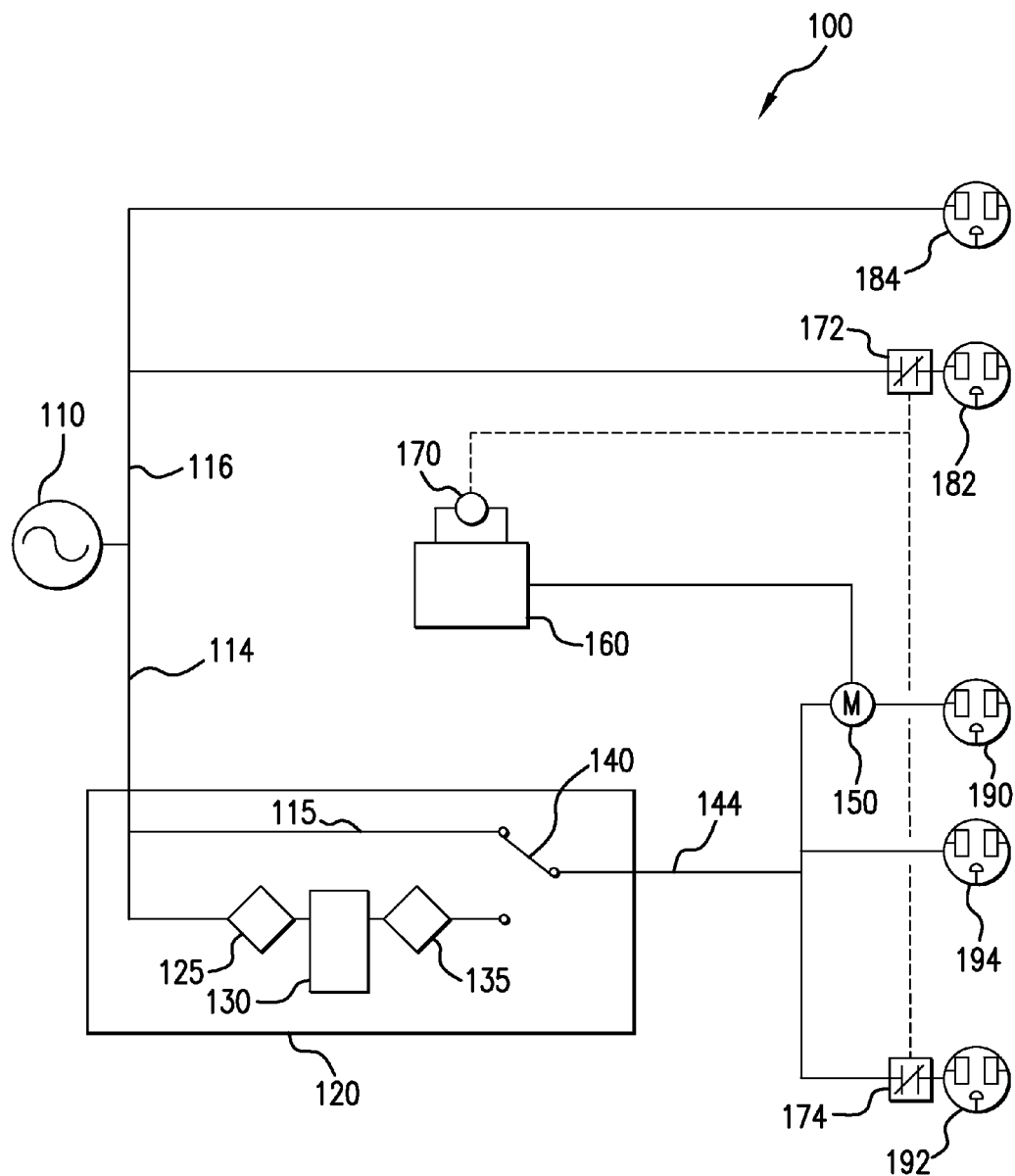
FIG. 1 depicts a schematic diagram of an illustrative system for controlling the flow of power based upon one or more measured parameters associated with one or more devices, according to one or more embodiments described.

FIG. 1 depicts a schematic diagram of an illustrative system 100 for controlling the flow of power based upon one or more measured parameters associated with one or more devices, according to one or more embodiments. In one or more embodiments, the illustrative system can include one or more current sources 110, conductors (two are shown 114 and 116), uninterruptible power supplies 120, monitors 150, control logic devices 160, switches (two are shown 172 and 174), interruptible service connections (two are shown 182 and 184), service connections (three are shown 190, 192 and 194). In one or more embodiments, current supplied by the source 110 can be apportioned equally or unequally between an uninterruptible power supply ("UPS") and an interruptible supply using one or more conductors. In one or more embodiments, the source 110 can be coupled to the UPS using one or more conductors 114. In one or more embodiments, the source 110 can be coupled to one or more interruptible service connections 182, 184 via one or more conductors 116.

The current source 110 can include any type of electrical current for example, current distributed by an electric utility, current generated, using local or remote generators, current supplied from a capacitor, battery, or other form of energy storage device. The current source 110 can supply either alternating current ("AC") or direct current ("DC"). The current source 110 can operate at a voltage of from about 50 volts to about 300 volts; about 75 volts to about 250 volts; or about 100 volts to about 250 volts. In one or more specific embodiments, the current source 110 can be utility generated, 60 Hz, single phase power supplied at 100 to 127 volts AC (rms). In one or more specific embodiments, the current source 110 can be utility generated, 50 Hz, single or dual phase power supplied at 220 to 240 volts AC (rms). In one or more embodiments, the current source 110 can be a wall outlet connected to a local utility distribution grid operating at a voltage of from about 100 VAC to about 240 VAC and at a frequency of from about 50 Hz to about 60 Hz.

All or a portion of the current supplied by the current source 110 can be distributed to one or more interruptible service connections 182, 184. In one or more embodiments, the source 110 can be coupled to the interruptible service connection using one or more conductors. As depicted in FIG. 1, current supplied to a first interruptible service connection 182 can pass through one or more first switches ("first contacts") 172. In one or more embodiments, the current supply 110 can be directly coupled to a second interruptible service connection 184 using one or more conductors 116. In one or more, embodiments, the source 110 can be coupled to the UPS 120 using one or more conductors 114.

The UPS 120 can be any form of energy storage system or device suitable for providing a replacement current source when the current source 110 is disrupted or otherwise removed. The UPS 120 can include one or more parallel bypass circuits 115 and energy storage circuits coupled to the uninterruptible current 144 by one or more bypass switches 140.

While the current source 110 is available, the bypass circuit 115 can couple the conductors 114 feeding the UPS to one or more service connections 190, 192, 194 via the one or more conductors 144. Although not depicted in FIG. 1, the current flowing through the bypass circuit can be filtered or otherwise conditioned to minimize the amplitude and/or severity of any spikes, sags or other disturbances transferred from the current source 110 to the one or more service connections 190, 192, 194 via the one or more conductors 144.

The energy storage circuit within the UPS 120 can include, one or more rectifiers 125 to convert an alternating current ("AC") into direct current ("DC"). The DC power produced by the rectifiers 125 can be introduced to and stored within one or more energy storage devices 130. The energy storage devices 130 can include, but are not limited to, one or more batteries, capacitive storage devices, inertial storage devices or any combination thereof. The one or more batteries can include, but are not limited to, one or more lead/acid batteries, nickel-metal hydride (NiMh) batteries, lithium ion batteries, or any combination thereof.

When the current source 110 is removed or interrupted, the transfer switch 140 can switch from the bypass circuit 115, to the energy storage circuit. Current flow from the energy storage devices 130 can be converted using one or more inverters 135 prior to supplying the stored energy to the one or more service connections 190, 192, 194 via the conductor 144. In one or more embodiments, the conductor 144 can be directly connected to one or more service connections 190 and 194. In one or more embodiments, the current supplied to a first service connection 192 can pass through one, or more second switches ("second contacts") 174.

One or more monitors 150 can be disposed in, on, or about the one or more conductors 144 coupling the service connection 190 to the UPS 120. The one or more monitors can include any device, system, or combination of systems and devices suitable for measuring the power, current, voltage, frequency or any other operating parameters of the conductors 144 providing current to the service connection 190. In one or more embodiments, the one or more monitors can include one or more doughnut style current sensors to measure the current flow to the service connection 190. In one or more embodiments, the one or more monitors 150 can include one or more power sensors, for example one or more doughnut style current sensors and one or more voltage sensors. The current and voltage measurements collected using the monitor can be passed through an appropriate algorithm to measure the actual power drawn by an external device connected to the service connection 190. The power drawn by external device connected to the service connection 190 can be closely estimated by measuring the current in the conductor 144 providing current to the service connection 190 provided the voltage is constant.

The one or more monitors 150 can be coupled to one or more control logic devices 160. The control logic device 160 can be a stand-alone controller, a comparator, or a portion of a larger controller, for example a computer CPU or a controller for the UPS 120. The control logic device 160 can include two or more internal registers, an instruction set, and one or more outputs for interfacing to external devices. In one or more embodiments, the external device can include, but is not limited to, a relay 170 controlling the opening and closing of the first and second contacts 172 and 174.

In one or more embodiments, the first and second contacts 172 and 174 can include one or more "normally-closed" contacts (as depicted in FIG. 1), one or more "normally-open" contacts, or any combination thereof. The first and second contacts 172 and 174 can be rated for continuous. AC or DC service. In one or more embodiments, the first and second contacts 172 and 174 can be rated for continuous 120 VAC service at a current of about 15 A or less; about 10 A or less; about 5 A or less; or about 2 A or less.

As used herein the terms "normally-open" and "normally-closed" can refer to the position of the first and second contacts 172 and 174 in an unpowered state, i.e. when the relay 170 is in an unpowered state. Normally-open contacts are not electrically continuous in an unpowered state, while normally-closed contacts are electrically continuous in an unpowered state.

In one or more specific embodiments, the relay 170 can have a coil input rating of 12 VDC and one or more "normally-closed" contacts 175 rated for continuous service at 15 A at 120 VAC. In one or more specific embodiments, all or a portion of the power for the relay 170 can be supplied by the UPS 120.

The relay 170 can be energized using one or more outputs on the control logic device 160. In one or more embodiments, the relay 170 can be AC powered; operating at an input voltage of about 3 volts or more; about 6 volts or more; 12 volts or more; about 24 volts or more; about 115 volts or more; or about 230 volts or more. In one or more embodiments, the relay 170 can be DC powered; operating at an input voltage of about 0.5 volts or more; about 1.5 volts or more; about 3 volts or more; 6 volts or more; about 12 volts or more; or about 24 volts or more. In one or more specific embodiments, the relay 170 can have an AC coil operating at a voltage of about 120 VAC. In one or more specific embodiments, the relay 170 can have an AC coil operating at a voltage of about 230 VAC.

In one or more embodiments, the relay 170 can be a time delay relay in which the first and second contacts 172 and 174 transition from an open position to the closed position (or vice-versa) at the expiration of a predetermined delay period after removing power from the relay 170. The predetermined delay can be a fixed or an adjustable time interval. In one or more embodiments, the delay can be a minimum of about 5 seconds; about 10 seconds; about 20 seconds; about 30 seconds; about 45 seconds; about 60 seconds; or about 120 seconds after removing power from the relay 170.

Figure 2:
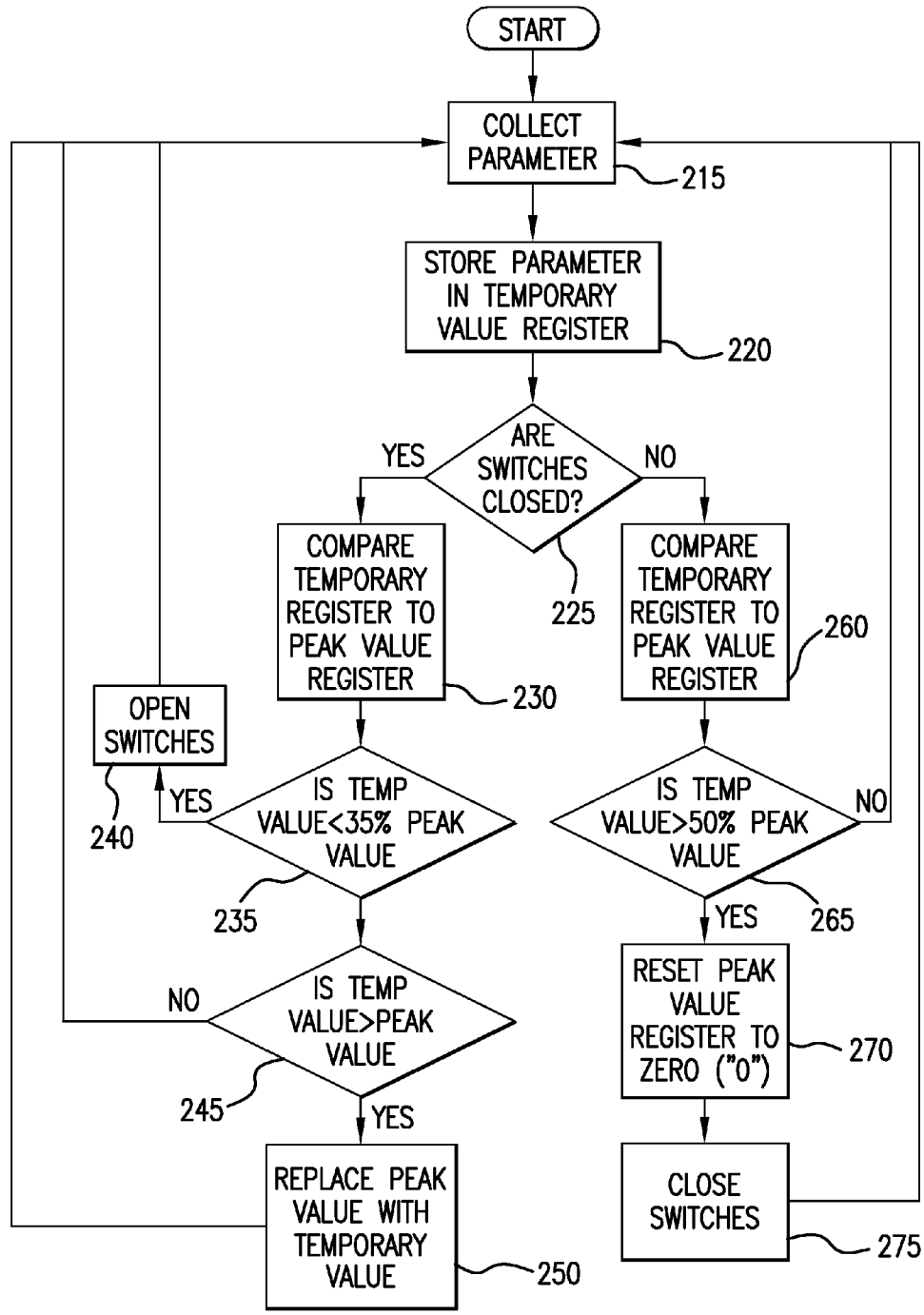
FIG. 2 depicts an exemplary system for controlling the flow of power based upon the power consumption of a computer CPU, according to one or more embodiments described.

FIG. 2 depicts an illustrative logic flow diagram for controlling the flow of power based upon the power consumption of one or more devices, according to one or more embodiments. An exemplary control logic device 160 can include sufficient registers and instruction sets to execute the control logic depicted in FIG. 2. Although the monitor 150 can measure more than one parameter, the operation of an exemplary control logic device 160 will be discussed with respect to measurement of a single parameter to one or more external devices using the monitor 150. It should be readily apparent to those of ordinary skill in the art that through the use of one or more algorithms, for example an algorithm converting 120 VAC current and voltage into power, a multitude of equally effective embodiments can be encompassed.

The parameter measured by the monitor 150 can be transmitted to the control logic device 160 in step 215. The transferred parameter value can be loaded into a first ("temporary value") register in the control logic device 160 in step 220. In one or more embodiments, any data loaded into the temporary value register can overwrite any data present within the temporary value register.

The control logic device 160 then determines whether the first and second switches 172 and 174 are open (i.e. not permitting current to pass through the switch) or closed (i.e. permitting current to pass through the switch) in step 225.

If the first and second switches 172 and 174 are closed, the control logic device first compares the temporary value register with a second ("peak value") register in step 230. The control logic device can then determine if the value in the temporary value register is less than a first pre-determined setpoint in step 235. If the value in the temporary value register is less than the first pre-determined setpoint, the control logic device 160 output to the relay 170 can be adjusted to open the first and second switches 172 and 174.

In one or more embodiments, the first pre-determined value used to open the first and second contacts 172 and 174 can be a maximum of about 10% of the value stored in the peak value register; about 20% of the value stored in the peak value register; about 30% of the value stored in the peak value register; about 10% of the value stored in the peak value register; about 40% of the value stored in the peak value register; about 50% of the value stored in the peak value register; about 60% of the value stored in the peak value register; about 70% of the value stored in the peak value register; about 75% of the value stored in the peak value register; or about 80% of the value stored in the peak value register. In one or more embodiments, the first pre-determined setpoint can be manually adjusted by the user of the system 100. After opening the first and second contacts 172 and 174 in step 240, the control logic device 160 can loop, once again collecting a new measured parameter value in step 215.

In one or more specific embodiments, the first pre-determined value used to open the first and second contacts 172 and 174 can be based upon a deviation of the parameter measured by the monitor 150 from the peak value stored in the peak value register. In one or more embodiments, the first pre-determined value can be based on a deviation between the parameter measured by the monitor 150 and the value stored in the peak value register of about +/−10% or more; about +/−20% or more; about +/−40% or more; about +/−50% or more; about +/−60% or more; or about +/−80% or more; from the value stored in the peak value register.

If the value in the temporary value register is greater than or equal to the first pre-determined setpoint, the control logic device 160 can then determine whether the value in the temporary value register is greater than the value in the peak value register in step 245. If the value in the temporary value register is not greater than the value in the peak value register, the control logic device can loop, collecting a new parameter value from the monitor 150 in step 215. If the value in the temporary value register is greater than the value in the peak value register, the control logic device 160 can replace the value in the peak value register with the value in the temporary value register in step 250. In one or more embodiments, any data loaded into the peak value register can overwrite any data already present within the peak value register. After loading the peak value into the peak value register, the control logic device 160 can loop, once again collecting a new parameter value from the monitor 150 in step 215.

Returning to step 225, if the first and second contacts 172 and 174 are open, the control logic device 160 first compares the temporary value register with the peak value register in step 260. The control logic device 160 can then determine if the value in the temporary value register is greater than a second pre-determined setpoint in step 265. If the value in the temporary value register is less than the second pre-determined setpoint, the control logic device 160 can loop, once again collecting a new parameter value from the monitor 150 in step 215. In one or more embodiments, the second pre-determined value can be a minimum of about 50% of the value stored in the peak value register; a minimum of about 60% of the value stored in the peak value register; a minimum of about 70% of the value stored in the peak value register; a minimum of about 80% of the value stored in the peak value register; a minimum of about 90% of the value stored in the peak value register; or a minimum of about 95% of the value stored in the peak value register.

If the value in the temporary value register is greater than the second pre-determined setpoint, the peak value register can be reset to a zero or null value in step 270. After resetting the peak value register in step 270, the control logic device 160 can then close the first and second switches in step 275, restoring power to their respective service connections before looping back to collect a new parameter value from the monitor 150 in step 215.

Figure 3:
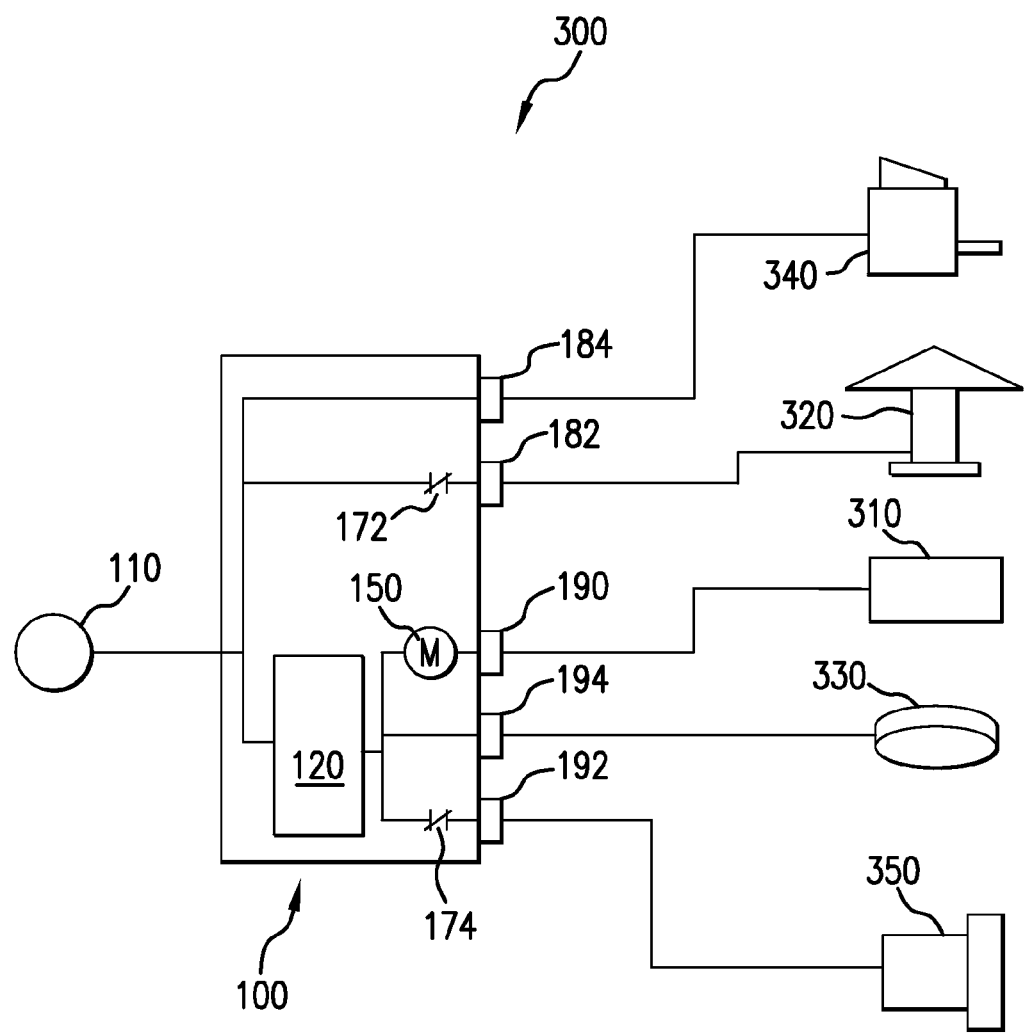
FIG. 3 depicts a schematic illustration of an exemplary system for controlling the flow of power to one or more peripheral devices based upon operating parameters of a computer CPU, according to one or more embodiments described.

FIG. 3 depicts a schematic illustration of an exemplary system 300 for controlling the flow of power to one or more peripheral devices based upon operating parameters of a computer CPU 310, according to one or more embodiments. In one or more embodiments, an illustrative system 300 can include one or more systems 100, one or more computer central processing units ("CPUs") 310, one or more lamps 320, one or more storage devices 330, one or more printers 340, and one or more video monitors 350. The CPU 310 can be supplied with power from a service connection 190 having one or more monitors 150 disposed thereupon. The lamp 320 can be powered using an interruptible service connection 182 having one or more first switches 172 disposed therein. The storage device 330 can be supplied with power from a service connection 194 coupled directly to the UPS 120 uninterruptible current via one or more conductors 144. The printer 340 can be supplied with power from an interruptible service connection 184 supplied with power directly from the source 110 via one or more conductors 116. The video monitor 350 can be supplied with power from a service connection 192 having one or more second switches 192 disposed therein.

The CPU 310 can be, any power consuming device having a plurality of power consuming states, for example a first, high-power, "active" state and a second, low-power, "sleep" state. In one or more embodiments, the CPU 310 can be an Advanced Configuration and Power Interface ("ACPI") compliant, personal computer CPU, having multiple power conservation states. Using an ACPI compliant chipset, software such as Windows XP® or Windows Vista® can directly control low-level details of the power consumption of the CPU 310. ACPI incorporates power management features permitting the CPU 310 to enter extremely low power consumption states when the CPU 310 is inactive for an extended or pre-determined period of time.

ACPI divides system status into four general states: G0 is a working state that the system is ordinarily in while active; G1 is a sleeping state that is further subdivided into four "sub-states" S1 through S4 that the system enters after a period of inactivity; G2, also referred to as S5, is a "soft-off" state the system enters after an extended period of inactivity; G3 is a "hard-off" state that is entered when power is removed from the system.

ACPI S3 can be referred to as "suspend to RAM" in the BIOS; "standby" in versions of Windows through Windows XP® and in some varieties of Linux; and "sleep" in Windows Vista®. In ACPI S3 state, the RAM remains powered, thus the contents of RAM remain unchanged when the computer is restored to the G0 working state. The computer is faster to resume from ACPI S3 than to reboot, and any running applications (opened documents, etc) containing private information will not be written to the disk since the RAM remains powered throughout ACPI S3. Since the data in RAM is not written to non-volatile storage, any power interruption which occurs while the system is in S3 may result in the loss of data stored in RAM.

ACPI S4 can be referred to as a "suspend to disk" state. While in ACPI S4, some components remain powered so the device can "wake" based upon an external signal, for example a signal from a keyboard, a clock, a modem, a local area network (LAN), or a USB device. In ACPI S4, they contents of RAM are saved to a non-volatile memory, preserving the state of the operating system and any opened programs at the time ACPI S4 is entered. ACPI S4 differs from ACPI S3 by writing the contents of RAM to a non-volatile location. Thus, any interruption in power while in ACPI S4 does not result in the loss of unsaved data as would occur in ACPI S3.

While ACPI S5 is nearly identical to a mechanical power off state, it differs slightly in that some components remain powered so the device can "wake" based upon an external signal, for example a signal from a keyboard, a clock, a modem, a local area network (LAN), or a USB device. ACPI S5 requires that the system run the boot procedure to bring the system to an active state. ACPI S5 can be initiated by the operating system often after the user has issued: a shutdown command in some form. Although internal drives are usually not powered in ACPI S5, the keyboard, USB ports, motherboard, expansion cards, and power supply can remain energized.

FIG. 4 presents illustrative power savings based upon an exemplary system including one or more peripheral devices and a CPU 310, according to one or more embodiments. At full operating load, the exemplary system presented a power signature of approximately 305 W. At the lowest "Power On" state where both the monitor and all internal drives were powered down, the exemplary system presented a power signature of 160 W or about 52% of the peak power signature. Upon entering the ACPI S3 state, the exemplary system presented a power signature of 10 W or about 3% of the peak power signature.

Upon entering an ACPI S3 state, the CPU 310 can present a power signature substantially lower than the ACPI G0 state power signature. In one or more embodiments, the power signature in the ACPI S3, S4 and S5 states can range from about 0.5% of the ACPI G0 maximum power signature to about 60% of ACPI G0 maximum power signature; from about 1% of the ACPI G0 maximum power signature to about 40% of the ACPI G0 maximum power signature; or from about 2% of the ACPI G0 maximum power signature to about 30% of the ACPI G0 maximum power signature. For example, for the system discussed with reference to FIG. 4, the ACPI S3 power demand can present a load of about 3% of the maximum system power signature in a G0 state, or a load of about 6% of the minimum system power signature in a G0 state. Based on the data presented in FIG. 4, setting the first pre-determined setpoint at about 10% of peak value would permit opening the switches 175 and restoring power to one or more peripherals when the computer CPU entered an ACPI S3 sleep state from either the maximum or minimum system power signatures. Similarly, based on the criteria presented in FIG. 4, setting the second pre-determined setpoint at about 25% of peak value would permit closing the first and second switches 175 and restoring power to one or more peripherals when the CPU 310 exits an ACPI sleep state greater than S3.

Returning to FIG. 3, when the source 110 is available and CPU 310 enters an ACPI S3, S4 or S5 compliant sleep state, the current flow will drop to less than 10% of peak power signature value. Upon dropping beneath 10% of peak value, the first and second switches 172 and 174 will open, interrupting power to the lamp 320 and the monitor 350. The storage device 330 and the printer 340, connected to service connections 194 and 184, respectively, will continue to receive power regardless of the ACPI state of the CPU 310. Maintaining power to selected devices can minimize the likelihood of data corruption in the storage device 330 and/or print head damage in the printer 340 both of which may be attributable to the unexpected removal and/or restoration of power.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for controlling the flow of power, comprising:
    a current source coupled to an uninterruptible power supply to provide an uninterruptible current;
    a first service connection, wherein the first service connection is coupled to the uninterruptible current using one or more conductors;
    one or more interruptible service connections, wherein the one or more interruptible service connections are coupled to the current source using one or more conductors;
    a monitor, measuring one or more parameters, disposed in, on, or about the conductor coupling the uninterruptible current to the first service connection;
    a control logic device coupled to the monitor; and
    a first switch disposed in, on, or about the one or more conductors coupling the current source to the one or more interruptible service connections, wherein the control logic device controls the first switch based upon one or more parameters measured by the monitor,
        wherein the control logic device comprises one or more registers, and wherein the one or more registers contain the peak value of the one or more parameters measured by the monitor; and,
        wherein the control logic device interrupts current flow through the first switch when the parameter measured by the monitor falls below about 35% of the value in the one or more registers; and,
        wherein the control logic device resumes current flow through the first switch when the parameter measured by the monitor rises above about 50% of the value in the one or more registers.

2. The system of claim 1 further comprising:
    a second service connection; and a second switch disposed in, on, or about the one or more conductors coupling the second service connection to the uninterruptible current, wherein the control logic device controls the second switch based upon one or more parameters measured by the monitor.

3. The system of claim 1 further comprising:
a third service connection coupled to the uninterruptible current; and
one or more second interruptible service connections connectively coupled to the current source.

4. The system of claim 1, wherein the one or more parameters comprise: current, voltage, frequency, real power, reactive power, power factor, or any combination thereof.

5. A system for controlling the flow of power, comprising:
a current source coupled to an uninterruptible power supply to provide an uninterruptible current;
a first service connection, wherein the first service connection is coupled to the uninterruptible current using one or more conductors;
one or more interruptible service connections, wherein the one or more interruptible service connections are coupled to the current source using one or more conductors;
a monitor, measuring one or more parameters, disposed in, on, or about the conductor coupling the uninterruptible current to the first service connection;
a control logic device coupled to the monitor; and
a first switch disposed in, on, or about the one or more conductors coupling the current source to the one or more interruptible service connections, wherein the control logic device controls the first switch based upon one or more parameters measured by the monitor,
wherein the control logic device comprises one or more registers, and wherein the one or more registers contain the peak value of the one or more parameters measured by the monitor; and,
wherein the control logic device interrupts current flow through the first switch when the deviation between the parameter measured by the monitor and the value in the one or more registers is about 60% of the value in the one or more registers or greater; and,
wherein the control logic device resumes current flow through the first switch when the deviation between the parameter measured by the monitor and the value in the one or more registers is about 40% of the value in the one or more registers or less.

6. The system of claim 5 further comprising:
a second service connection; and
a second switch disposed in, on, or about the one or more conductors coupling the second service connection to the uninterruptible current, wherein the control logic device controls the second switch based upon one or more parameters measured by the monitor.

7. The system of claim 5 further comprising:
a third service connection coupled to the uninterruptible current; and
one or more second interruptible service connections connectively coupled to the current source.

8. The system of claim 5, wherein the one or more parameters comprise: current, voltage, frequency, real power, reactive power, power factor, or any combination thereof.

9. A method for controlling the flow of power, comprising:
introducing all or a portion of an current source to an uninterruptible power supply to provide an uninterruptible current;
distributing all or a portion of the uninterruptible current to a first service connection;
distributing at least a portion of the current source to a first interruptible service connection;
measuring one or more first service connection parameters using a monitor and a control logic device;
interrupting the flow of the current source to the first interruptible service connection in response to a decrease in one or more parameters measured by the monitor; and
resuming the flow of the current source to the first interruptible service connection in response to an increase in the one or more parameters measured by the monitor.

10. The method of claim 9, further comprising:
interrupting the flow of the uninterruptible current to a second service connection in response to a decrease in one or more parameters measured by the monitor; and
resuming the flow of the uninterruptible current to the second service connection in response to an increase in one or more parameters measured by the monitor.

11. The method of claim 9, wherein the one or more parameters comprise:
current, voltage, real power, reactive power, power factor, frequency or any combination thereof.

12. The method of claim 9, wherein interrupting and resuming the flow of the current source to the first interruptible service connection comprises:
storing the peak value of the one or more parameters measured by the monitor in one or more peak value registers;
flowing the current source to the first interruptible service connection while the one or more parameters measured by the monitor remain at or above 35% of the value stored in the peak value register;
interrupting the flow of the current source to the first interruptible service connection while the one or more parameters measured by the monitor remains below 35% of the value contained in the peak value register;
flowing the current source to the first interruptible service connection (182) when the one or more parameters measured by the monitor increases above 50% of the value contained in the peak value register; and
resetting the one or more peak value registers when the one or more parameters measured by the monitor increases above 50% of the value contained in the peak value register.

* * * * *

UNITED STATES PATENT AND TRADEMARK OFFICE
CERTIFICATE OF CORRECTION

PATENT NO. : 8,656,201 B2  Page 1 of 1
APPLICATION NO. : 13/063757
DATED : February 18, 2014
INVENTOR(S) : Robert Campesi et al.

It is certified that error appears in the above-identified patent and that said Letters Patent is hereby corrected as shown below:

In the Claims:

In column 12, line 49, in Claim 12, after "connection" delete "(182)".

Signed and Sealed this
Third Day of June, 2014

Michelle K. Lee
*Deputy Director of the United States Patent and Trademark Office*